United States Patent [19]

Kawashita et al.

[11] Patent Number: 5,000,505
[45] Date of Patent: Mar. 19, 1991

[54] ROTARY DEVICE FOR FRONT SEATS OF A MOTOR VEHICLE

[75] Inventors: Nobutaka Kawashita; Kenji Muramatsu, both of Hiroshima, Japan

[73] Assignee: Mazda Motor Corporation, Hiroshima, Japan

[21] Appl. No.: 404,967

[22] Filed: Sep. 11, 1989

[30] Foreign Application Priority Data

Sep. 9, 1988 [JP] Japan .................. 63-227288

[51] Int. Cl.$^5$ ............................................. B60N 2/14
[52] U.S. Cl. .................. 296/65.1; 296/68.1; 297/240; 297/349
[58] Field of Search ............ 296/64, 65.1, 68.1; 297/240, 257, 349

[56] References Cited

U.S. PATENT DOCUMENTS

| | | | |
|---|---|---|---|
| 2,290,464 | 7/1942 | Buchheit | 296/65.1 |
| 3,572,817 | 3/1971 | Colautti et al. | 297/349 X |
| 4,487,452 | 12/1984 | Tanizaki et al. | 297/349 |
| 4,669,780 | 6/1987 | Sakakibara et al. | 297/257 |
| 4,792,188 | 12/1988 | Kawashima | 296/65.1 X |
| 4,812,838 | 3/1989 | Tashiro et al. | 296/65.1 X |
| 4,900,079 | 2/1990 | Obara et al. | 297/257 X |

FOREIGN PATENT DOCUMENTS

| | | | |
|---|---|---|---|
| 227528 | 12/1984 | Japan | 296/65.1 |
| 202934 | 9/1986 | Japan | 297/240 |

Primary Examiner—Margaret A. Focarino
Assistant Examiner—Andrew C. Pike
Attorney, Agent, or Firm—Wenderoth, Lind & Ponack

[57] ABSTRACT

A rotary device for front seats of a motor vehicle enables both a driver seat and a front passenger seat to be rotatably capable of taking an ordinary forwardly facing position and a rearwardly facing position. The device includes a first detection switch provided in the driver seat for electrically detecting the position of the driver seat, a second detection switch provided in the passenger seat for electrically detecting the position of the passenger seat, a first rotation control provided in the driver seat for preventing or permitting the operation of a rotation release lever of the driver seat, and a second rotation control provided in the passenger seat for preventing or permitting the operation of the another rotation release lever of the passenger seat. A control system electrically controls the first and the second rotation controls by receiving signals from the first and the second detection switches so as to prevent a condition such that the driver seat is in the forwardly facing position but the passenger seat is in the rearwardly facing position.

11 Claims, 7 Drawing Sheets

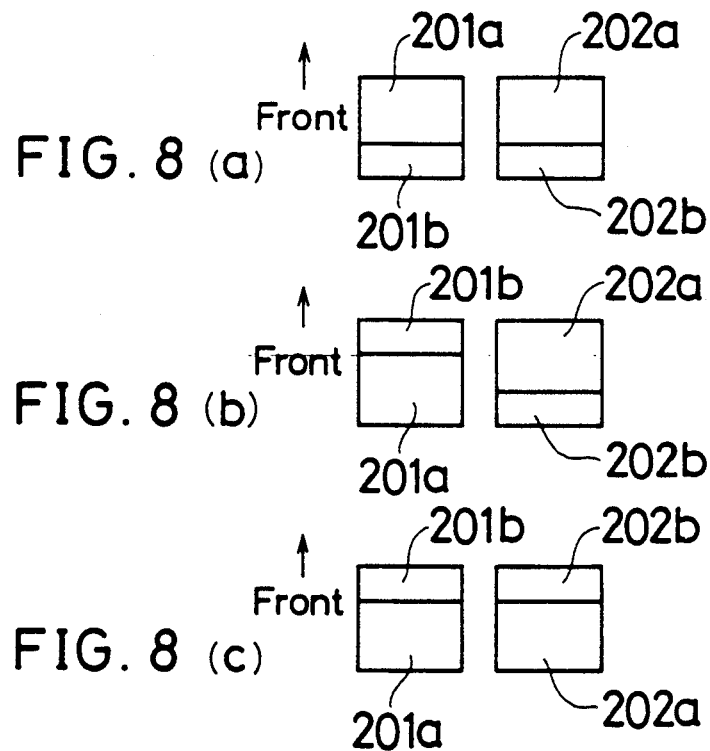
FIG. 8 (a)
FIG. 8 (b)
FIG. 8 (c)
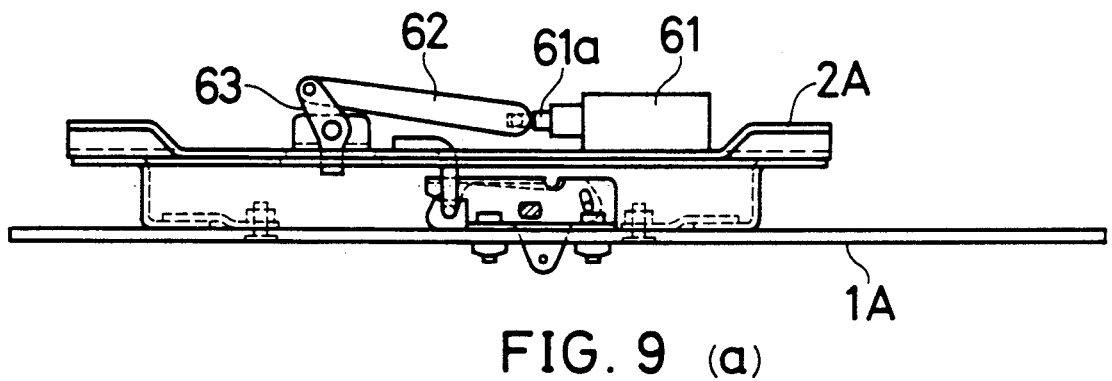
FIG. 9 (a)
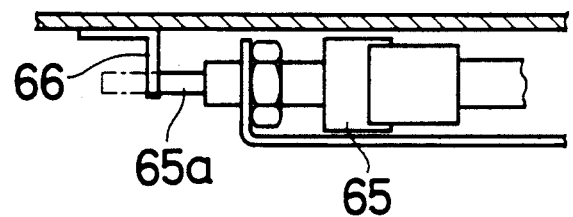
FIG. 9 (b)

ROTARY DEVICE FOR FRONT SEATS OF A MOTOR VEHICLE

BACKGROUND OF THE INVENTION

1. Field of the Invention

The present invention relates to a rotary device for front seats of a motor vehicle, wherein both a driver seat and a front passenger seat are rotatable in such a manner that each seat is capable of taking an ordinary forwardly facing position and a rearwardly facing position.

2. Description of the Prior Art

A multi-purpose motor vehicle wherein both a driver seat and an assistant driver or front passenger seat are rotatable and capable of taking an ordinary forwardly facing position and a rearwardly facing position is known.

One example of a rotary device for front seats of the above-mentioned type of motor vehicle is disclosed in Japanese Patent Application Laid Open Gazette No. 59-227528. As a safety measure, this device provides that a driver seat should always be in the rearwardly facing position when a passenger seat is turned to a rearwardly facing position, and likewise that the passenger seat should always be in the forwardly facing position when the driver seat is turned to the forwardly facing position. This device also provides that an operation lever for detecting the position of the above-mentioned seats and an engaging pin for engaging with a rotation release lever are connected by means of a remote control or a remotely operated cable or wire. However, such a rotary device involves some disadvantages due to mechanical operation thereof by such remote control wire. For example, special consideration must be given to install a remote control wire, especially when there is a projecting portion (a tunnel portion) between a driver seat and a front passenger seat, as in ordinary passenger cars. As a result, mounting a remote control wire leads to a complex construction and a troublesome assembly operation of the body of the vehicle.

As discussed in Japanese Patent Application Laid Open Gazette No. 61-202934, a rotary seat device controlled by a control cable to prevent a situation such that a driver seat is in a forwardly facing position but an assistant driver or front passenger seat is in a rearwardly facing position also is known. However, this device also entails complexity of mounting the control cable in the same way as the device utilizing the remote control wire described above.

SUMMARY OF THE INVENTION

The primary object of the present invention is to provide a rotary device for front seats of a motor vehicle, wherein the device is of simple construction and is easily assembled, and whereby the device electrically controls rotation of a driver seat and of an assistant or front passenger seat, without use of or dependence on mechanical control by a remote control operation wire or cable.

The above and other objects are achieved according to this invention by provision of a rotary device for front seats of a motor vehicle including a driver seat and a front passenger seat each capable of taking a forwardly facing position and a rearwardly facing position by the operation of respective first and second rotation release levers. The device includes a first detection switch provided in the driver seat for electrically detecting the position of the driver seat, a second detection switch provided in the passenger seat for electrically detecting the position of the passenger seat, first rotation control means provided in the driver seat for prohibiting or permitting the operation of the first rotation release lever, second rotation control means provided in the passenger seat for prohibiting or permitting the operation of the second rotation release lever, and control means for electrically controlling the first and the second rotation control means by receiving signals from the first and the second detection switches so as to prohibit a condition such that the driver seat is in the forwardly facing position but the passenger seat is in the rearwardly facing position.

With this construction of the present invention, the first and second rotation control means are controlled electrically by the control means after receiving signals from the first and the second detection switches so as to prevent or permit the operation of the respective rotation release lever of the driver seat or of the passenger seat. Thus, a condition such that the driver seat is in the forwardly facing position but the passenger seat is in the rearwardly facing position can be prevented.

The driver seat and the passenger seat are mounted on rotary tables which are rotatably supported on rotation bases rested on the floor of a motor vehicle. In order to lock and unlock the rotation of the driver seat or the passenger seat, a rotation release lever of the driver seat or of the passenger seat is connected with a respective hook member pivoted on the rotation base, and catch members with which the hook members detachably engage are installed on each rotary table.

The first and the second control means release or prevent the release of locking and unlocking of the rotation of the rotary tables which rotate the driver seat and the passenger seat on the rotation bases by the operation of the rotation release levers.

Preferably, the first and the second rotation control means are actuators operable in response to signals from the first and the second detection switches and swing levers connected to the actuators for engaging with the hook members on the rotation bases to prevent disengagement between the hook members and the catch members.

The control means controls the passenger seat to be in a rotatable condition when the driver seat is in the rearwardly facing position.

The first and the second detection switches are limit switches and the actuators are electric motors. The first and the second limit switches are mounted on the rotary tables respectively of the driver and the passenger seats, and first and second projection members are provided on the rotation bases respectively of the driver and the passenger seats. In this arrangement, the first detection switch detects the rearwardly facing position of the driver seat when a switch terminal thereof makes contact with the first projection member, while the second detection switch detects the forwardly facing position of the passenger seat when a switch terminal thereof makes contact with the second projection member.

Each actuator mounted on the respective rotary table is provided with an axially movable operation rod. Fitted on an end of the operation rod is a swing lever. Accordingly, the swing lever of the driver seat alternatively selects engagement and disengagement between the respective hook member and catch member while the driver seat is in the rearwardly facing position. Similarly, the swing lever of the passenger seat alternatively selects engagement and disengagement between the respective hook member and catch member while the passenger sat is in the forwardly facing position.

The above-mentioned and additional objects and advantages of the invention will be more apparent from the following detailed description with reference to the accompanying drawings.

BRIEF DESCRIPTION OF THE DRAWINGS

The accompanying drawings illustrate a preferred embodiment of this invention. In the drawings:

FIGS. 8(a)-8(c) are explanatory drawings of rotary motions of the driver seat and the passenger seat;

FIGS. 9(a) and 9(b) are sectional views showing alternate embodiments of the present invention.

DETAILED DESCRIPTION OF THE INVENTION

Figure 10:
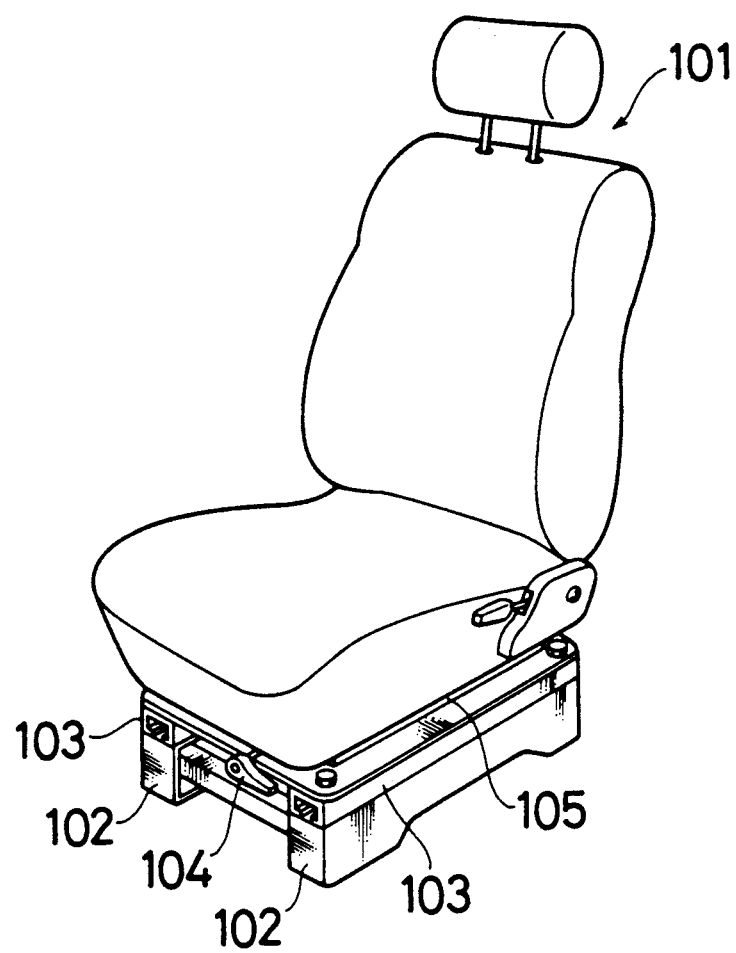
FIG. 10 is a perspective illustration of a driver seat.

The following is a detailed description of the preferred embodiment of the present invention in connection with the accompanying drawings. As shown in FIG. 10, a driver seat (as well as a passenger seat) 101 is installed on the floor of a vehicle body by means of support bases 102. Provided between the driver seat 101 and the support bases 102 are respective slide devices 103 for enabling the driver seat 101 to slide in the longitudinal direction of the vehicle body and a rotary device 105 for enabling the driver seat 101 to be rotated upon the operation of a rotation release lever 104. The slide device will not be discussed herein.

Figure 1:
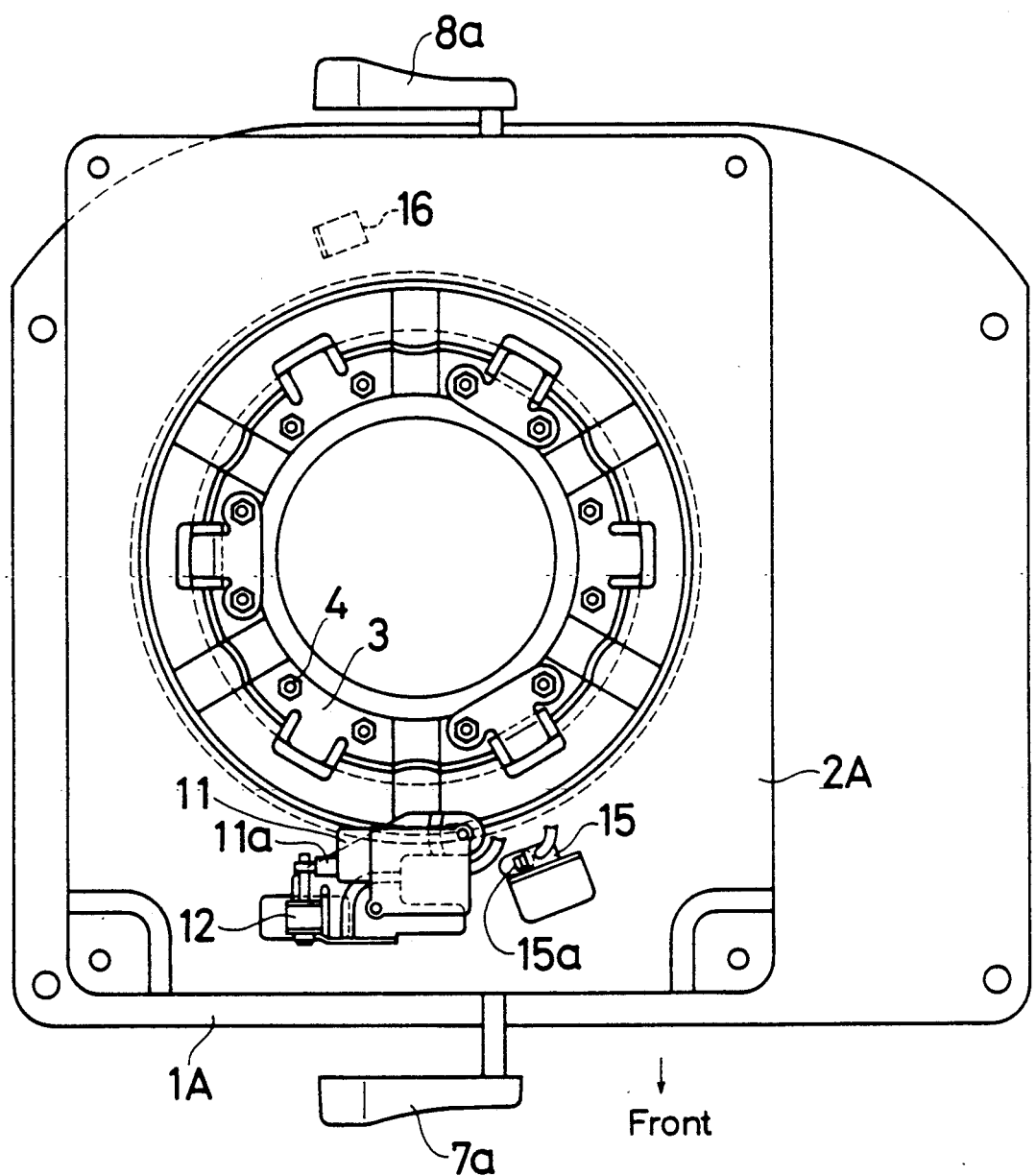
FIG. 1 is a plan view showing schematically the construction of a driver seat.
Figure 2:
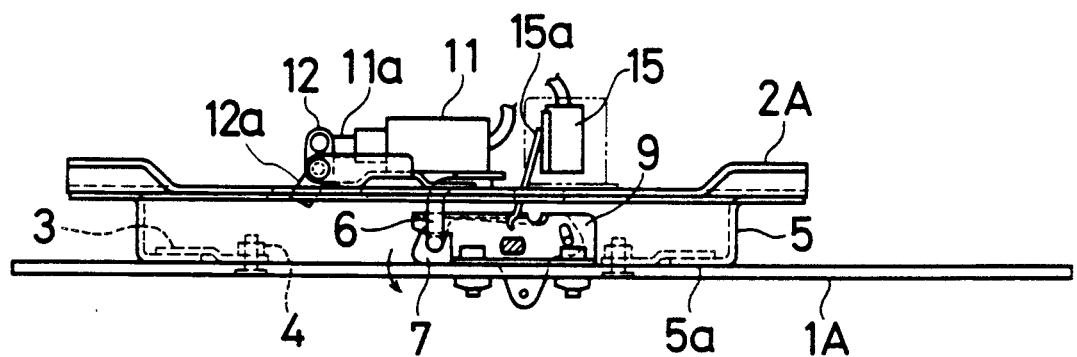
FIG. 2 is a front view of a rotation base and a rotary table of the driver seat when located in a forwardly facing position.
Figure 3:
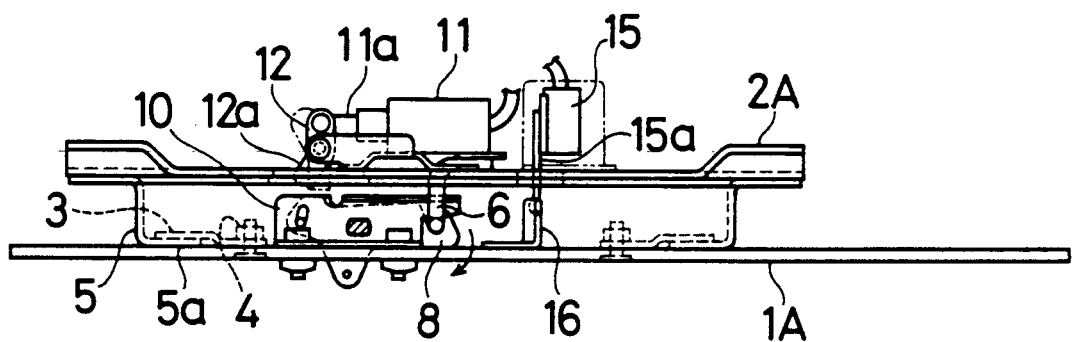
FIG. 3 is a rear elevation of the rotation base and the rotary table of the driver seat when located in a rearwardly facing position.

In FIG. 1 through FIG. 3 schematically showing the composition of the driver seat, reference numeral 1A designates a rotation base supported on the floor of the vehicle body. Reference numeral 2A designates a rotary table supported rotatably on the rotation base 1A. On the rotary table 2A is to be fitted a seat cushion (not shown in FIGS. 1-3) of the driver seat.

A ring-shaped guide member 3 is fixed on rotation base 1A by a plurality of fixing members 4, while at the lower side of the rotary table 2A is secured an engaging member 5 having an inwardly extending engaging part 5a on the periphery thereof. The engaging part 5a of the engaging member 5 engages rotatably and slidably within a circumferential guide groove defined between the rotation base 1A and the ring-shaped guide member 3. In this way, the rotary table 2A is rotatable relative to the rotation base 1A with the engaging part 5a extending into and being guided in the circumferential groove.

On the rotary table 2A is fastened a catch member 6 having an edge extending downwardly. Hook members 7, 8 for detachably or releasably locking the catch member 6 are pivotably supported on the front side and the rear side, respectively, of the rotation base 1A. Accordingly, the driver seat becomes rotatable when a rotation release lever 7a or 8a, connected with the hook members 7 and 8, respectively, is pivotally operated to release locking of the catch member 6 by the hook member 7 or 8.

Provided on the upper sides of hook members 7, 8 are respective cover members 9, 10 for preventing unintentional disengagement of the catch member 6 from the hook members 7, 8.

On the upper front side of the rotary table 2A is mounted an actuator 11 (e.g. an electric motor) having an axially movable operation rod 11a. Swingably connected at the outer end of the operation rod 11a is a swing lever 12 which has a dogleg or L-shaped configuration as viewed in section. As shown in FIG. 2, in the ordinary forwardly facing position of the driver seat, the swing lever 12 is located at a position spaced from the hook member 7. As a result, engagement between the hook member 7 and the catch member 6 can be released by operation of the rotation release lever 7a, thus permitting rotation of the driver seat. On the other hand, as shown in FIG. 3, in the rearwardly facing position of the driver seat, a locking part 12a at the edge of the swing lever 12 is located at the upper side of the hook member 8. The swing lever 12 is actuated by the actuator 11, thereby to alternatively select a rotation preventing position or a rotation permitting position. To be more specific, as indicated by dashed lines in FIG. 3, in the rotation preventing position for preventing rotation of the driver seat, the swing lever 12 prevents disengagement between the catch member 6 and the hook member 8 by prohibiting pivotal movement of the hook member 8 upon operation of the rotation release lever 8a. Alternatively, as indicated by solid lines in FIG. 3, in the rotation permitting position for permitting rotation of the driver seat, the swing lever 12 allows release of engagement between the catch member 6 and the hook member 8 by enabling pivotal movement of the hook member 8 upon operation of the rotation release lever 8a.

The above-mentioned arrangement constitutes a first control means provided in the driver seat for preventing or permitting the operation of the rotation release lever 8a in response to actuation of the actuator 11.

A first detection switch 15, comprising a limit switch for electrically detecting the rearward facing position of the driver seat, is mounted on the rotary table 2A in proximity to the actuator 11. A projection member 16 projects upwardly from the rear of rotation base 1A. In this configuration, when the driver seat is in the rearwardly facing position, the projection member 16 makes contact with a switch terminal 15a of the first detection switch 15 (FIG. 3). As a result, the first detection switch 15 is switched "ON", thereby detecting the rearwardly facing position of the driver seat.

Unlike the rear side of the rotation base 1A, a projection member is not provided on the front side of the rotation base 1A. Accordingly, in case of the forwardly facing position of the driver seat, the first detection switch 15 never becomes "ON" (FIG. 2).

Figure 4:
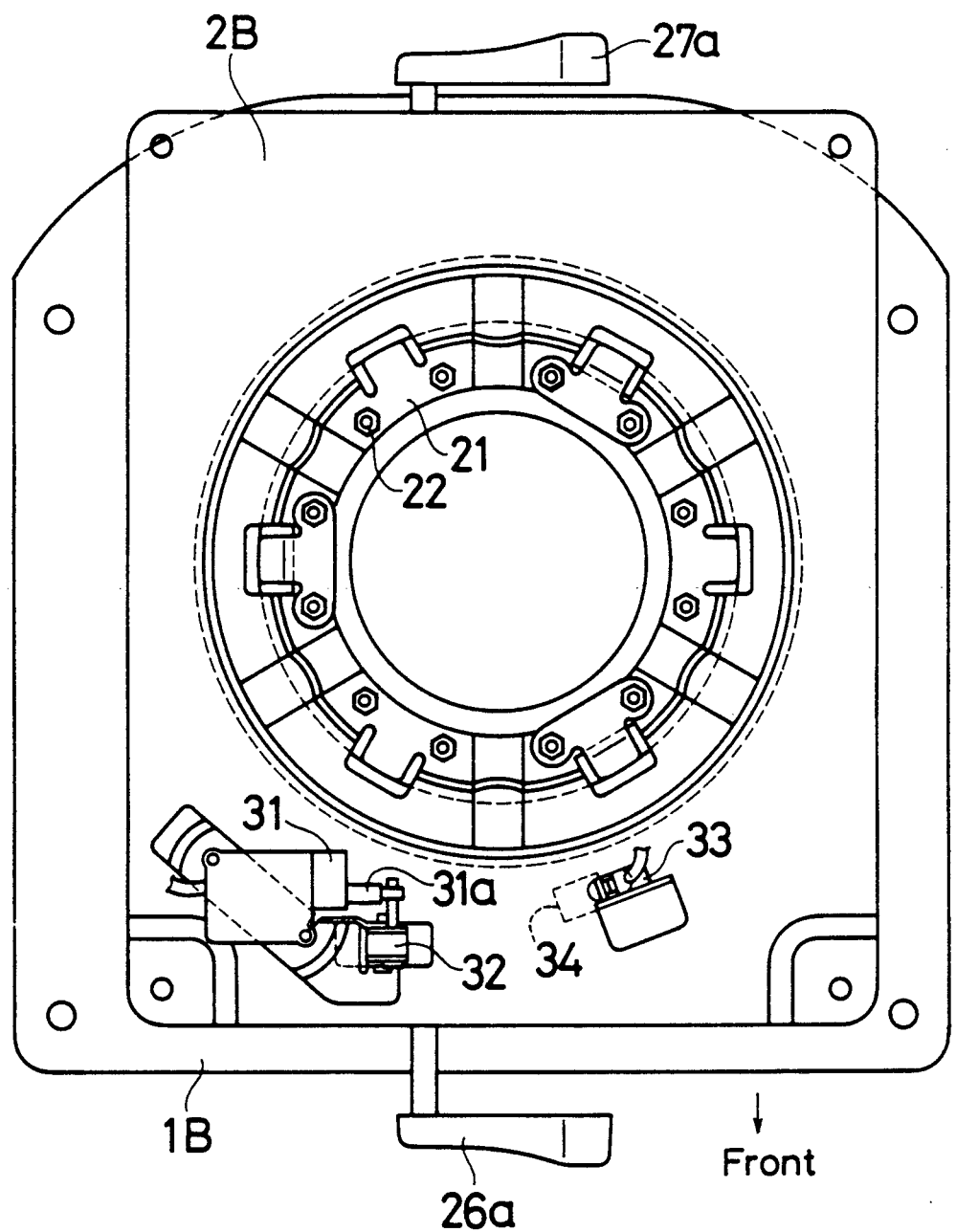
FIG. 4 is a plan view showing schematically the construction of a front passenger seat.
Figure 5:
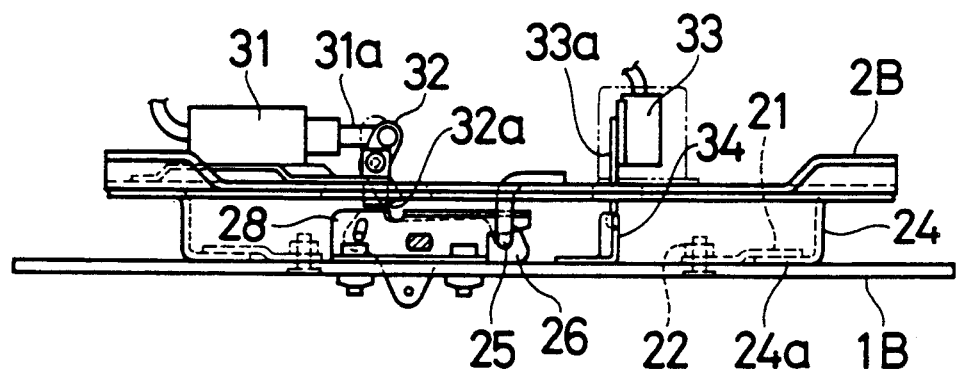
FIG. 5 is a front view of a rotation base and a rotary table of the passenger seat when located in a forwarding facing position.
Figure 6:
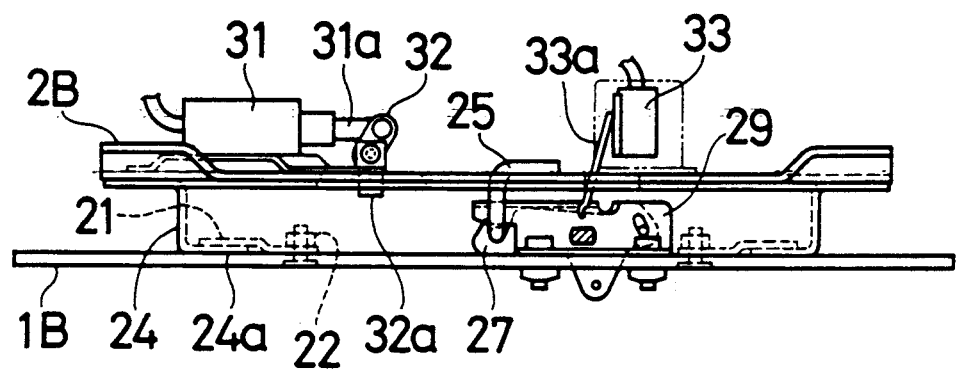
FIG. 6 is a rear elevation of the rotation base and the rotary table of the passenger seat when located in a rearwardly facing position.

A passenger or assistant seat has a structure similar to that of the driver seat. As shown in FIG. 4 through FIG. 6, a ring=shaped guide member 21 is fixed on the upper side of a rotation base 1B by means of a plurality of fixing members 22, while at the lower side of a rotary table 2B is secured an engaging member 24 having an inwardly extending engaging part 24a at the inner periphery thereof. The engaging part 24a of the engaging member 24 engages rotatably and slidably within a circumferential guide groove defined between the rotary base 1B and the guide member 21.

On the rotary table 2B is fastened a catch member 25 having an edge extending downwardly. Hook members 26, 27 for detachably or releasably locking the catch member 25 are pivotably supported on the front side and the rear side, respectively, of the rotation base 1B. Accordingly, the passenger or assistant seat becomes rotatable when a rotation release lever 26a or 27a, connected with the hook members 26 and 27, respectively, is pivotally operated to release locking of the catch member 25 by the hook member 26 or 27.

Provided on the upper sides of each hook members 26, 27 are respective cover members 28, 29 for preventing unintentional disengagement of the catch member 25 from the hook members 26, 27.

On the upper front side of the rotary table 2B is mounted an actuator 31 (e.g. an electric motor) having an axially movable operation rod 31a. Swingably connected at the outer end of the operation rod 31a is a swing lever 32 which has a dogleg or L-shaped configuration as viewed in section. As shown in FIG. 6, in the rearwardly facing position of the passenger seat, the swing lever 32 is located at a position spaced from the hook member 27. As a result, engagement between the hook member 27 and the catch member 25 can be released by operation of the rotation release lever 27a, thus permitting rotation of the passenger seat. On the other hand, as shown in FIG. 5, in the forwardly facing position of the passenger seat, a locking part 32a at the edge of the swing lever 32 is located at the upper side of the hook member 26. The swing lever 32 is actuated by the actuator 31, thereby to alternatively select a rotation preventing position or a rotation permitting position. To be more specific, as indicated by solid lines in FIG. 5, in the rotation preventing position for preventing rotation of the passenger seat, the swing lever 32 prevents disengagement between the catch member 25 and the hook member 26 by prohibiting pivotal movement of the hook member 26 upon operation of the rotation release lever 26a. Alternatively, as indicated by dashed lines in FIG. 5, in the rotation permitting position for permitting rotation of the passenger seat, the swing lever 32 allows release of engagement between catch member 25 and hook member 26 by enabling pivotal movement of the hook member 26 upon operation of the rotation release lever 26a. The above-mentioned arrangement constitutes a second control means provided in the passenger seat for preventing or permitting the operation of the rotation release lever 26a in response to actuation of the actuator 31.

A second detection switch 33, comprising a limit switch for detecting the forwardly facing position of the passenger seat is mounted on the front side of rotary table 2B. A projection member 34 projects upwardly from the front side of rotation base 1B. Therefore, when the projection member 34 comes into contact with a switch terminal 33a of the second detection switch 33, the forwardly facing position of the passenger seat is detected.

Unlike the front side of the rotary base 1B, a projection member is not provided on the rear side of the rotation base 1B. Accordingly, in case of the rearwardly facing position of the passenger seat, the second detection switch 33 never becomes "ON" (FIG. 6).

Figure 7:
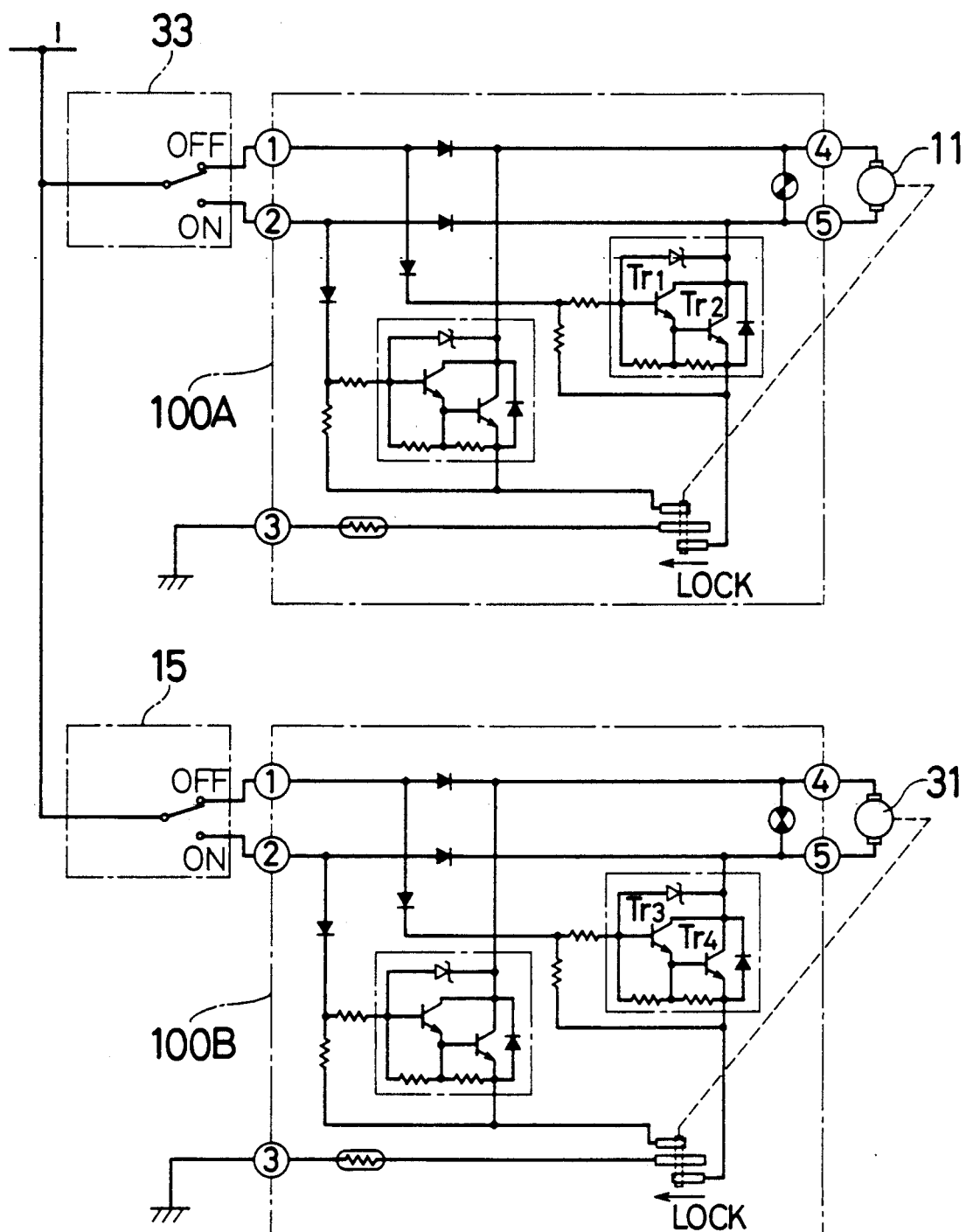
FIG. 7 is an electric circuit diagram of a control system for controlling the rotation of the driver seat and the passenger seat.

As shown in FIG. 7, the detection switches 15, 33 and the actuators 11, 31 are interconnected by a harness, not shown, extending through openings passing through the centers of the rotation bases 1A, 1B and the rotary tables 2A, 2B.

More specifically, the second detection switch 33 is connected with the actuator (motor) 11 of the first rotation control means through a control circuit 100A. When detecting that the passenger seat is not in the forwardly facing position, the second detection switch 33 becomes "OFF" and a terminal 1 thereof is connected with a battery. Then first and the second transistors $Tr_1$, $Tr_2$ of the control circuit 100A transmit electricity by conduction and a fixed amount of electric current is sent to the actuator 11. Consequently, the actuator 11 is activated to move the swing lever 12 into the position indicated by the dashed lines in FIG. 3. As a result, when the driver seat is in the rearwardly facing position it is locked thereat, and when the driver seat is in the forwardly facing position it is not locked, i.e. it is unlocked, thereat.

When the passenger seat is in the forwardly facing position, the second detection switch 33 is switched "ON" and a terminal 2 thereof is connected with the battery. Therefore, the actuator 11 turns in the opposite direction, thus enabling unlocking of the driver seat.

The first detection switch 15 is connected electrically with the actuator (motor) 31 of the second rotation control means through a control circuit 100B. When detecting that the driver seat is not in the rearwardly facing position, the first detection switch 15 is switched "OFF" and a terminal 1 thereof is connected with the battery. Then third and the fourth transistors $Tr_3$, $Tr_4$ of the control circuit 100B transmit electricity by conduction and the actuator 31 is activated. Therefore, when the passenger seat is in the forwardly facing position it is locked thereat, and when the passenger sat is in the rearwardly facing position it is not locked, i.e. it is unlocked, thereat. When the driver seat is in the rearwardly facing position, a terminal 2 of switch 15 is connected with the battery. Therefore, the actuator is driven in the opposite direction, thus enabling unlocking of the passenger seat.

The above-mentioned control circuits 100A, 100B form a control means for controlling the rotation of the driver seat and the passenger seat so as to prohibit a condition such that the driver seat is in the forwardly facing position but the passenger seat is in the rearwardly facing position.

In the following, description will be made as to how to shift the seats from a forwardly facing or driving position to the rearwardly facing position or to shift the seats from the rearwardly facing position to the driving position. In FIG. 8, reference numeral 201a designates a seat cushion of the driver seat and numeral 201b designates a seat back thereof, while reference numeral 202a designates a seat cushion of passenger seat and numeral 202b designates a seat back thereof.

(1) Shift from the driving position to the rearwardly facing position

When driving, both the driver seat and the passenger assistant seat are in the forwardly facing positions (FIG. 8(a)). Since the second detection switch 33 detects the forwardly facing position of the passenger seat, the actuator 11 is not activated to lock the driver seat. As a result, the driver seat (the rotary table 2A) may be unlocked. Hence, the driver seat can be rotatable by the operation of the rotation release lever 7a.

On the other hand, the first detection switch 15 detects the forwardly facing position of the driver seat. Therefore, the passenger seat (the rotary table 2B) is locked by the activation of the actuator 31 (the solid line position in FIG. 5), thus preventing rotation to the rearwardly facing position of the passenger seat.

Then, when rotating the driver seat to the rearwardly facing position (FIG. 8(b)), the first detection switch 15 detects the rearwardly facing position of the driver seat, and the operation rod 31a of the actuator 31 moves backward to release the lock of the passenger seat, thus enabling unlocking of the passenger seat (the dashed line position of FIG. 5). The driver seat remains unlocked. Consequently, the passenger seat can be rotated. When rotating the passenger seat to the rearwardly facing position (FIG. 8(c)), the second detection switch 33 detects the rotary movement of the passenger seat and the actuator 11 is activated simultaneously with the start of rotation of the passenger seat to lock the driver seat (the dashed line position in FIG. 3).

At this time, since the driver seat is locked in the rearwardly facing position and there is no possibility of starting the motor vehicle, the passenger seat remains unlocked and rotatable. Accordingly, turning the driver seat to the forwardly facing position for starting the motor vehicle is restricted when the passenger seat is in the rearwardly facing position.

(2) Shift from the rearwardly facing position to the driving position

When both the driver seat and the passenger seat are in the rearwardly facing position (FIG. 8(c)), as described above, only the passenger seat is unlocked. Therefore, first the passenger seat should be rotated to the forwardly facing position (FIG. 8(b)). Then, the second detection switch 33 detects such rotation and activates the actuator 11 to thereby enable unlocking of the driver seat (the solid line position in FIG. 3). When rotating the driver seat to the forwardly facing position (FIG. 8(a)), the first detection switch 15 detects such rotation and activates the actuator 33 to lock the passenger seat in the forwardly facing position simultaneously with the start of rotation of the driver seat (the solid line position in FIG. 5). As a result, since only the passenger seat is prevented from taking the rearwardly facing position, driving of the vehicle with the passenger seat in the rearwardly facing position is practically impossible.

Although the above preferred embodiment connects the swing levers 12, 32 directly with the operation rods 11a, 31a of the actuators 11, 31, as shown in FIG. 9(a) the edge of an operation rod 61a of an actuator 61 can be indirectly connected with the upper end of a swing lever 63 by means of an intermediate link 62. As shown in FIG. 9(b), a detection switch 65 that is switched "ON" when a projection of an operation rod 65a of the detection switch 65 is shortened by coming into contact with a projection member 66 can be employed.

As this invention may be embodied in several forms without departing from the spirit of essential characteristics thereof, the above embodiment therefore is illustrative and not restrictive. Since the scope of the invention is defined by the appended claims rather than by the description preceding them, all changes that fall within the scope of the claims, or equivalents of such scope, are intended to be embraced by the claims.

We claim:

1. A device for controlling rotation of front seats of a motor vehicle including a driver seat capable of rotation between an ordinary forwardly facing position and a rearwardly facing position by the operation of a first rotation release lever and a front passenger seat capable of rotation between an ordinary forwardly facing position and a rearwardly facing position by the operation of a second rotation release lever, said device comprising:

a first detection switch to be operatively associated with the driver seat for detecting the position of the driver seat and for generating an electrical signal representative thereof;

a second detection switch to be operatively associated with the passenger seat for detecting the position of the passenger seat and for generating an electrical signal representative thereof;

first rotation control means associated with the driver seat for preventing or permitting the operation of the first rotation release lever;

second rotation control means associated with the passenger seat for preventing or permitting the operation of the second rotation release lever; and control means receiving said signals from said first and said second detection switches for electrically controlling said first and said second rotation control means so as to prevent a condition such that the driver seat is in the ordinary forwardly facing position but the passenger seat is in the rearwardly facing position.

2. A device as claimed in claim 1, further comprising, for each of the driver seat and the passenger seat, a rotation base to be supported on a floor of a vehicle body and a rotary table rotatably mounted on said rotation base.

3. A device as claimed in claim 2, wherein said first and second rotation control means permit and prevent operation of the first and second rotation release levers, respectively, to thus release and prevent the release of locking and unlocking of rotation of said rotary tables with respect to said rotation bases of the driver and passenger seats, respectively.

4. A device as claimed in claim 2, further comprising catch members mounted on respective of said rotary tables, and hook members pivotally mounted on respective of said rotation bases for detachable engagement and disengagement with said catch members upon operation of the rotation release levers.

5. A device as claimed in claim 4, wherein said first and second rotation control means comprise respective actuators operable in response to said signals from said first and second detection switches and swing levers mounted on respective said actuators for engaging with said hook members of respective said rotation bases to prevent disengagement between said hook members and respective said catch members.

6. A device as claimed in claim 5, wherein said first and second detection switches are limit switches.

7. A device as claimed in claim 6, wherein said first and second limit switches are provided on said rotary tables respectively of the driver seat and the passenger seat, and first and second projection members project from said rotation bases respectively of the driver and passenger seats, whereby said first limit switch detects the rearwardly facing position of the driver seat when a switch terminal of said first limit switch comes into contact with said first projection member, and said second limit switch detects the forwardly facing position of the passenger seat when a switch terminal of said second limit switch comes into contact with said second projection member.

8. A device as claimed in claim 5, wherein said actuators are electric motors.

9. A device as claimed in claim 8, wherein said motors are mounted on respective said rotary tables and are provided with respective movable operation rods, and respective said swing levers are mounted at ends of respective said operation rods.

10. A device as claimed in claim 5, wherein said swing lever of the driver seat alternatively selects engagement and disengagement between the respective said hook member and catch member in the rearwardly facing position of the driver seat, and said swing lever of the passenger seat alternatively selects engagement and disengagement between the respective said hook member and catch member in the forwardly facing position of the passenger seat.

11. A device as claimed in claim 1, wherein said control means comprises means for controlling the passenger seat in such a manner that the passenger seat is rotatable when the driver seat is in the rearwardly facing position thereof.

* * * * *